United States Patent [19]
Rayabhari

[11] Patent Number: 6,044,428
[45] Date of Patent: Mar. 28, 2000

[54] CONFIGURABLE UNIVERSAL SERIAL BUS NODE

[75] Inventor: Madhu Rayabhari, Cupertino, Calif.

[73] Assignee: Fairchild Semiconductor Corporation, South Portland, Me.

[21] Appl. No.: 09/040,110

[22] Filed: Mar. 17, 1998

[51] Int. Cl.[7] .............................. G06F 13/10; G06F 13/40; G06F 15/17; G06F 3/00
[52] U.S. Cl. ............................... 710/129; 710/63; 710/64
[58] Field of Search ....................... 710/100, 101, 710/104, 63, 64, 72, 126, 129, 3, 128; 712/37; 345/156, 168; 709/231; 370/257, 364, 912; 455/6.3

[56] References Cited

U.S. PATENT DOCUMENTS

| | | | |
|---|---|---|---|
| 5,396,639 | 3/1995 | Suenaga et al. ........................ | 712/37 |
| 5,485,590 | 1/1996 | Hyatt et al. ............................ | 711/115 |
| 5,623,686 | 4/1997 | Hall et al. .............................. | 712/32 |
| 5,659,801 | 8/1997 | Kopsaftis ............................... | 710/62 |
| 5,784,581 | 7/1998 | Hannah ................................. | 710/110 |
| 5,818,948 | 10/1998 | Gulick ................................... | 381/77 |
| 5,841,424 | 11/1998 | Kikinis .................................. | 345/168 |
| 5,859,993 | 1/1999 | Snyder .................................. | 712/208 |
| 5,914,877 | 6/1999 | Gulick .................................. | 364/400.01 |

*Primary Examiner*—Gopal C. Ray
*Attorney, Agent, or Firm*—Mikio Ishimaru

[57] ABSTRACT

A Universal Serial Bus node having a non-volatile memory is preprogrammed with the data bits necessary to configure an attached state machine to become a translator or modified translator for signals from a computer peripheral device. On startup, the Universal Serial Bus node is configured to translate signals to and from the computer peripheral device into USB protocol signals to and from a Universal Serial Bus equipped computer in order to assure proper communication therebetween.

26 Claims, 1 Drawing Sheet

CONFIGURABLE UNIVERSAL SERIAL BUS NODE

TECHNICAL FIELD

The present invention relates generally to personal computers and more specifically to personal computer peripheral devices for personal computers equipped to work with the Universal Serial Bus.

BACKGROUND ART

The Universal Serial Bus, (USB) standard, is a peripheral device bus standard developed by members of the personal computer and telecommunications industry to provide plug and play of computer peripheral devices outside the personal computer itself. It provides for a single, universal, interface connector and eliminates the current need for different ports and different jacks. It also eliminates the need to install different cards into dedicated computer slots and reconfigure the system. Personal computers, or PCs, equipped with USB allow computer peripheral devices to be automatically configured as soon as they are physically attached. The automatic configuration setup would occur without the need to reboot or run a setup program. The USB will also allow multiple devices (up to 127) to run simultaneously on a computer, with peripheral devices such as monitors and keyboards acting as additional plug-in sites, or hubs.

The range of peripheral devices permitted by the USB include monitors, keyboards, mice, game devices, audio IO devices, telephones, modems, CD ROM or DVD drives, joysticks, tape and floppy drives and, imaging devices such as scanners and printers. The 12-megabit per second data rate of the USB also accommodates a whole new generation of peripheral devices. These include more advanced computer game devices, high-fidelity audio and highly compressed video, like MPEG-1 and MPEG-2 video-based products, data gloves and digitizers. Also, since computer-telephony integration is expected to be a big growth area for PCs, the USB provides a low-cost interface for Integrated Services Digital Network (ISDN) and digital PBXs.

Drawing its intelligence from the host PC, the USB will detect and properly configure devices when added and removed. The host PC automatically determines what host resource, including driver software and bus bandwidth, each peripheral device needs and makes those resources available without user intervention. Users with a USB-equipped PC are able to switch in compatible peripheral devices as needed as easily as plugging in a lamp.

The USB in many ways resembles a telecommunications link with a defined protocol. The host PC sends out a large number of queries that the peripheral device must respond to. This protocol is spelled out in the USB Standard which describes the hardware and software required.

The problem with the USB is that every computer peripheral device must have a microcomputer, microprocessor or microcontroller (hereinafter generically referred to as "microcomputer") capable of responding to the queries from the host PC. The microcomputer has to have USB logic attached to it, memory associated with it, and the ability to handle communication with the host PC with software which monitors the signals almost at a bit and byte level.

Another problem with the USB is that every microcomputer has to be programmed according to the complex specifications in order to work with the USB. This requires that every computer peripheral device manufacturer must have or develop engineers who are familiar with the USB specification. A further problem is that engineers who develop mice currently would have little or no familiarity with telecommunications protocols provided for in the USB standards. Thus, they would have to acquire a complete set of software tools, microprocessor development systems, debugging systems, and test systems, not to mention the software expertise, to implement the USB specification which is about six hundred pages long.

In addition, even simple USB projects take between four and six man-months of engineering time and with the demand for shortened lead-time to market, this engineering time could be the difference between a successful product and a failure.

It has long been assumed that these problems were inherent in the USB.

DISCLOSURE OF THE INVENTION

The present invention provides a configurable Universal Serial Bus (USB) node containing a non-volatile memory having USB compatibility information stored in a certain set of bits capable of configuring an attached state machine to make a computer peripheral device compatible with a USB-equipped computer. The USB node is configured to translate signals between the computer peripheral device and the USB-equipped computer in conformance with the USB standard.

An advantage of the present invention is to provide a simple, easily developed node for translating signals from a computer peripheral device to signals useable by a USB equipped computer in conformance with the USB standard.

A further advantage of the present invention is to provide a simple, easily developed node for translating signals from a USB equipped computer in conformance with the USB standard to signals useable by a computer peripheral device.

A further advantage of the present invention is to provide a simple, easily developed node for responding to signals from a USB equipped computer in conformance with the USB standard to identify a computer peripheral device.

A further advantage of the present invention is to provide a simple, easily developed USB computer peripheral device useable with a USB equipped computer in conformance with the USB standard.

A further advantage of the present invention is to provide a simple, easily developed USB system.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
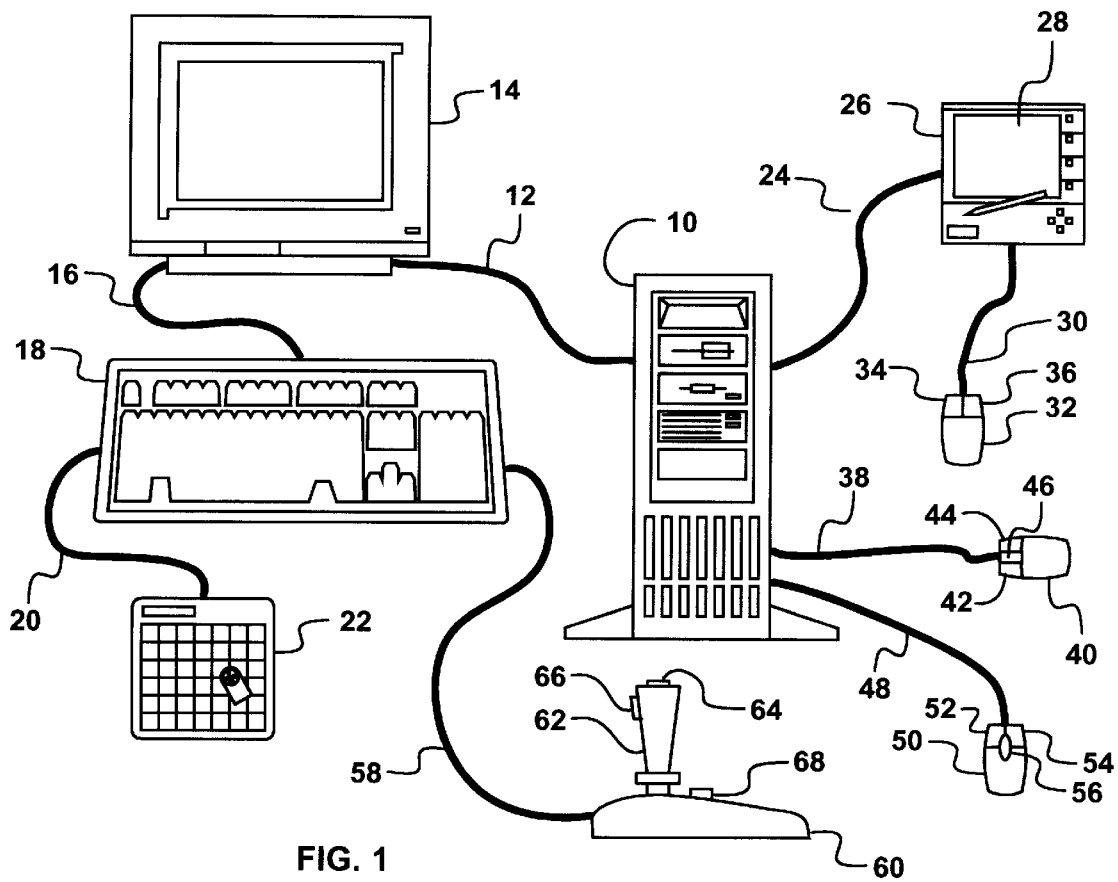
FIG. 1 is a personal computer system including typical USB computer peripheral devices.

Referring now to FIG. 1, therein is shown a host personal computer, or host PC 10, equipped with the Universal Serial Bus (USB) software and hardware. It is shown as a tower PC, but those skilled in the art would understand that the invention is applicable to any computer equipped to be compliant with the USB standards.

The host PC 10 is shown having a number of peripheral devices connected thereto. It should be understood that these peripheral devices are merely examples of different types of devices which could be connected to the host PC 10, and not all of these devices would be necessarily connected at any one time.

A cable 12 is connected to the host PC 10. This cable 12 is the same as all cables using the Universal Serial Bus in that the jacks are the same and is one of the significant advantages of the Universal Serial Bus. The host PC 10 is connected by the cable 12 to a monitor 14 which is serially connected by a cable 16 to a keyboard 18. This is an example of one of the other key advantages of USB, that peripheral devices may be daisy-chained in series connections. The serial connection of the monitor 14 to the keyboard 18 is most likely to be one of the more common arrangements for the USB. Further, a cable 20 also serially connects the keyboard 18 to a digitizer 22. The digitizer 22 falls into the general category of media peripherals which include scanners, printers, plotters, etc.

FIG. 1 further shows the host PC 10 connected by the cable 24 to a game pad 26 having a screen 28. The game pad 26 is serially connected by a cable 30 to a pointing device such as a mouse 32 which represents a family of pointing devices including trackballs and touch sensitive screens.

The mouse 32 is a two-button mouse having left and right buttons 34 and 36, respectively. A mouse having two buttons such as the mouse 32 is generally referred to as a two dimensional, or 2D, mouse.

Also connected directly to the host PC 10 by a cable 38 is a mouse 40. The mouse 40 has left and right buttons 42 and 44 and also a center button 46. A mouse having three buttons is called a three dimensional, or 3D, mouse.

The host PC 10 is further shown connected by a cable 48 to another type of 3D mouse. The scroll mouse 50 is characterized by having left and right buttons 52 and 54, and a scroll wheel 56. The scroll wheel 56 rotates to cause a document in a suitable software program to be scrolled up and down on the screen of the monitor 14.

Another computer peripheral device, which is connected by a cable 58 to the keyboard 18, is a joystick control 60. The joy stick control 60 has a joystick 62 having a finger trigger 66 and a thumb trigger 64 located thereon. The joystick control 60 further has a throttle switch 68 which provides additional control signals for certain games. The joystick control 60 falls into the general category of game peripherals which include the game pad 26.

Figure 2:
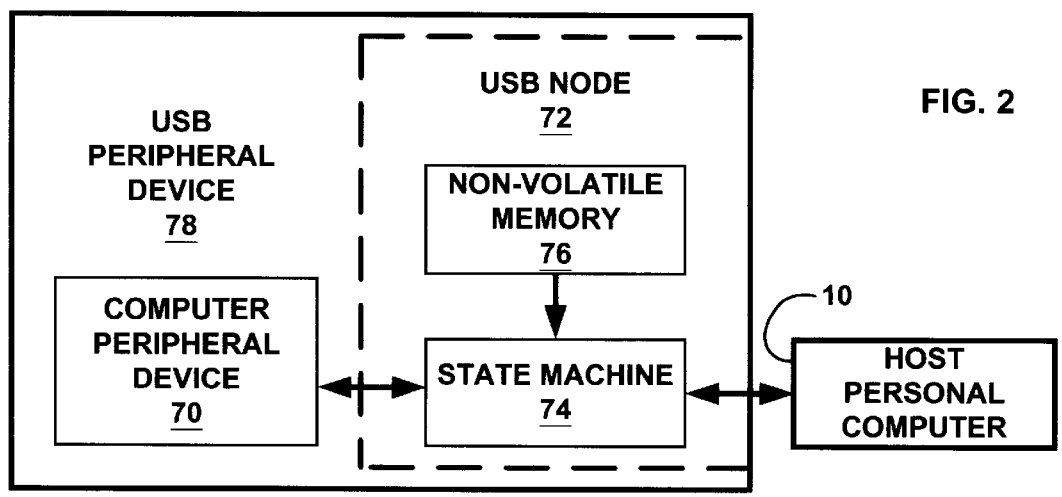
FIG. 2 is a general configuration of the present invention in a personal computer system.

Referring now to FIG. 2, therein in shown a computer peripheral device 70 which could be: a standard non-USB computer peripheral device with no change in function; a standard non-USB computer peripheral device with a new function; a brand new computer peripheral device; or a collection of physical input and output elements such as switches, photodiodes, LED's, potentiometers, etc.

The computer peripheral device 70 is connected to a configurable USB node 72. The configurable USB node 72 consists of a conventional state machine 74 and a non-volatile memory 76. The configurable USB node 72, when added to the computer peripheral device 70, forms a USB peripheral device 78.

For example, an old standard non-USB computer peripheral device, such as a non-USB mouse with the addition of the configurable USB node 72 at the non-USB mouse's output, would become a new USB mouse. Similarly, an old non-USB mouse having a scroll wheel could be converted to a new USB mouse having the scroll wheel used for a new function. For example, the new function for the scroll wheel could be to fast forward and back multimedia video pro-grams. This would be accomplished just by properly configuring the configurable USB node 72 and adding it at the output rather than by hardwiring changes or making changes in the multimedia software program. These conversions are in addition to the capability of making new computer peripheral devices, which have not been developed yet, easily and simply USB compatible.

Referring again to FIG. 2, the state machine 74 shown therein is circuitry that uses information from the non-volatile memory 76 as well as the current machine state to determine what the next machine's state will be and what signals or functions to provide. The state machine 74 is configured to modify signals passing back and forth between the computer peripheral device 70 and the host PC 10 to be in conformance with the USB standards.

It should be noted that the non-volatile memory 76 can be an EPROM, EEPROM, Flash, or other memory which will not lose its data when power is removed since peripheral devices are generally shipped unpowered. In applications where the peripheral device may have battery backup, for such functions as calendars, and always be under power, volatile memory can be used. It should be further noted that the state machine 74 could be placed on the same semiconductor chip as the non-volatile memory 76 or be a separate, but connected, semiconductor chip. In either arrangement, the configurable USB node 72 will preferably be located in the computer peripheral device 70 for which the non-volatile memory 76 is preprogrammed.

The non-volatile memory 76 is pre-programmed using a conventional programming utility for setting series of bits for the specific computer peripheral device 70 that USB node will be used in. The programming utility will be a conventional non-volatile memory programming software program which will lead a person who is unfamiliar with the USB to give a description of the peripheral intended to be used with the USB to load the proper bits. These bit patterns can be at any address in the non-volatile memory 76. The individual bit patterns can also be non-contiguous. For example, one set up could be as follows:

| | | | |
|---|---|---|---|
| Address 0 | $B_2$ | $B_1$ | $B_0$ |
| Address 1 | $M_2$ | $M_1$ | $M_0$ |
| . . . | . . | . . | . . |
| . . . | . . | . . | . . |

| Where: specific computer peripheral device 70 | $B_2$ | $B_1$ | $B_0$ |
|---|---|---|---|
| MOUSE = | 0 | 0 | 0 |
| JOYSTICK = | 0 | 0 | 1 |
| TRACKBALL = | 0 | 1 | 0 |
| GAMEPAD = | 0 | 1 | 1 |
| Etc. | . . | . . | . . |

| And for a mouse: Type of mouse | $M_2$ | $M_1$ | $M_0$ |
|---|---|---|---|
| THREE BUTTON = | 0 | 0 | 0 |
| TWO BUTTON = | 0 | 0 | 1 |
| ONE BUTTON = | 0 | 1 | 0 |
| Etc. | . . | . . | . . |

Thus, for a two-button mouse, the non-volatile memory 76 will have Address 0 loaded with the bits 000 and Address 1 loaded with the bits 001. Successive addresses will be loaded with other functions or features of the two-button mouse. For example, how many dots per inch each incremental movement of the mouse will cause on the monitor 14.

On power-up or reset of the computer peripheral device 70, the non-volatile memory 76 loads the set of predetermined bits into the state machine 74. These bits cause the state machine 74 to configure itself. When the host PC 10 provides a handshake signal, the state machine 74 is configured to provide a return identification signal indicating the nature of the computer peripheral device 70 attached to it and its output signals. The state machine 74 also configures itself to take the signals from the computer peripheral device 70 and convert them appropriately for use by the host PC 10. Where appropriate, the state machine 70 is configured to convert signals from the host PC 10 for use by the computer peripheral device 70.

For operation, the computer system will be arranged with the host PC 10 as the connection point for the various USB cables, which are different only in length. The USB will allow up to one hundred and twenty-seven computer peripheral devices 70 to run simultaneously on the host PC 10. Other peripheral devices such as the monitor 14 and keyboard 18 act as additional plug-in sites, or hubs for pointing devices such as mice 32, 40, or 50, game devices such as joystick control 60, etc. Essentially, a user will "plug" in the cables and peripheral devices, and they will "play" properly when turned on with no further adjustment.

In operation, during power up, the configurable USB node 72 configures itself as appropriate for the particular computer peripheral device 70 it is associated with so as to form the USB peripheral device 78. For example, with the host PC 10 and the monitor 14 powered up, power would be supplied to the keyboard 18 to turn it on and configure the keyboard's configurable USB node 72. With the keyboard 18 acting as a hub, the digitizer 22 and the joy stick control 60 will also be turned on. The configurable USB node 72 of the digitizer 22 and the configurable USB node 72 of the joystick control 60 will then be configured appropriately.

In response to hand shake signals from the host PC 10, the monitor 14, the keyboard 18, the digitizer 22, and the joy stick control 60 will identify themselves back to the host PC according to the USB protocol standards as the start of communications in the system. This is accomplished by the state machine 74 being configured to respond with the proper USB identification signals for the particular computer peripheral device 70.

In playing a computer game using the joystick control 60, the joystick 62, the thumb trigger 64, the finger trigger 66, and throttle 68 will send various signals to the state machine 74 in the joystick control 60. The state machine 74 will translate the angular settings of the joystick 62, the switch closures of the finger and thumb triggers 64 and 66, and the resistor settings of the throttle 68 into USB protocol signals in conformance with the USB standards. These signals will be sent back through the keyboard 18 and the monitor 14 to the host PC 10 where they will be processed to effect the images on the monitor 14.

If it is desired to change the operation of the joystick control 60, it is a simple matter to program or reprogram the non-volatile memory 76 to configure the state machine 74 to modify the signals out of the non-USB portion of the joystick control 60. For example, if it were desired to interchange the thumb trigger 64 and finger trigger 66 actions, the non-volatile memory 76 would merely require proper programming or reprogramming rather than changing the hardwiring of the joystick control 60.

In the event that the joystick control 60 is of the type having feed back, the host PC 10 will provide USB protocol signals back to the state machine 74. The state machine 74 will be configured to translate the USB signals from the host PC 10 into signals to force the joystick 62 to move appropriately. For example, for a fighter pilot game, the user would "feel" plane turbulence through the joystick 62.

As would be evident to those skilled in the art, the configurable USB node 72 provides a universal translator among computer peripheral devices and the Universal Serial Bus to allow full communication, and also can provide modification of functions. Thus, a brand new computer peripheral device with new outputs or a non-USB computer peripheral device with standard outputs can become USB compatible. Further, the USB node 72 can take the standard outputs of a non-USB computer peripheral device and modify the standard outputs to be different for input into the host PC 10.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims. All matters set forth herein or shown in the accompanying drawings are to be interpreted in an illustrative and non-limiting sense.

The invention claimed is:

1. A Universal Serial Bus node for a computer peripheral device to be used with a Universal Serial Bus equipped computer using the Universal Serial Bus standard, comprising:

a memory programmable with information related to the Universal Serial Bus and the computer peripheral device; and circuitry connected to said memory responsive to said information for configuring said circuitry to have the capability of providing signals from the computer peripheral device to the Universal Serial Bus equipped computer in conformance with the Universal Serial Bus standards.

2. The Universal Serial Bus node as claimed in claim 1 wherein said circuitry is responsive to said information from said memory for configuring said circuitry to have the capability of responding to signals from the Universal Serial Bus equipped computer in conformance with the Universal Serial Bus standard.

3. The Universal Serial Bus node as claimed in claim 1 wherein said circuitry is responsive to said information from said memory for configuring said circuitry to have the capability of identifying the computer peripheral device to the Universal Serial Bus equipped computer in conformance with the Universal Serial Bus standard.

4. The Universal Serial Bus node as claimed in claim 1 wherein said memory is a non-volatile memory.

5. The Universal Serial Bus node as claimed in claim 1 wherein said circuitry is a state machine.

6. The Universal Serial Bus node as claimed in claim 1 including a computer peripheral device and wherein said memory is programmed to cause said circuitry to allow communication between said computer peripheral device and the Universal Serial Bus equipped computer.

7. The Universal Serial Bus node as claimed in claim 1 including a computer peripheral device and wherein said memory is programmed to cause said circuitry to modify communication between said computer peripheral device and the Universal Serial Bus equipped computer.

8. The Universal Serial Bus node as claimed in claim 1 including a computer peripheral device and a Universal Serial Bus equipped computer wherein:

said Universal Serial Bus equipped computer queries said computer peripheral device for identification;

said circuitry identifies said computer peripheral device to said Universal Serial Bus equipped computer;

said Universal Serial Bus equipped computer responds to said circuitry;

said circuitry responds to said computer peripheral device; and said computer peripheral device providing signals for said circuitry to provide to said Universal Serial Bus equipped computer, all in conformance with the Universal Serial Bus standard.

9. A method for making a computer peripheral device useable with a Universal Serial Bus equipped computer using the Universal Serial Bus standard, comprising:

starting up a programmed memory having information related to the Universal Serial Bus standard and providing a configure signal related thereto; and configuring circuitry connected to said memory for receiving said configure signal to be able to receive signals from the computer peripheral device and provide said signals to the Universal Serial Bus equipped computer in conformance with the Universal Serial Bus standard.

10. A Universal Serial Bus node for a computer peripheral device to be used with a Universal Serial Bus equipped computer using the Universal Serial Bus standard, comprising:

a non-volatile memory programmable with information related to the Universal Serial Bus and the computer peripheral device; and a state machine connected to said memory responsive to said information for configuring said state machine to have the capability of providing signals from the computer peripheral device to the Universal Serial Bus equipped computer in conformance with the Universal Serial Bus standard.

11. The Universal Serial Bus node as claimed in claim 10 wherein said state machine is responsive to said information from said memory for configuring said state machine to have the capability of responding to signals from the Universal Serial Bus equipped computer in conformance with the Universal Serial Bus standard.

12. The Universal Serial Bus node as claimed in claim 10 wherein said state machine is responsive to said information from said memory for configuring said state machine to have the capability of identifying the computer peripheral device to the Universal Serial Bus equipped computer in conformance with the Universal Serial Bus standard.

13. The Universal Serial Bus node as claimed in claim 10 wherein said non-volatile memory is an EEPROM.

14. The Universal Serial Bus node as claimed in claim 10 wherein said non-volatile memory is a Flash memory.

15. The Universal Serial Bus node as claimed in claim 10 including a computer peripheral device and wherein said non-volatile memory is programmed to configure said state machine to allow communication between said computer peripheral device and the Universal Serial Bus equipped computer.

16. The Universal Serial Bus node as claimed in claim 10 including a computer peripheral device and wherein said non-volatile memory is programmed to configure said state machine to modify communications from said computer peripheral device and provide the modified communications between said computer peripheral device and the Universal Serial Bus equipped computer.

17. The Universal Serial Bus node as claimed in claim 10 wherein said computer peripheral device is a pointing device.

18. The Universal Serial Bus node as claimed in claim 10 wherein said computer peripheral device is a game peripheral.

19. The Universal Serial Bus node as claimed in claim 10 wherein said computer peripheral device is a multimedia peripheral.

20. The Universal Serial Bus node as claimed in claim 10 including a computer peripheral device and a Universal Serial Bus equipped computer wherein:

said Universal Serial Bus equipped computer queries said computer peripheral device for identification;

said state machine identifies said computer peripheral device to said Universal Serial Bus equipped computer;

said Universal Serial Bus equipped computer responds to said state machine;

said state machine responds to said computer peripheral device; and said computer peripheral device providing signals for said state machine to provide to said Universal Serial Bus equipped computer, all in conformance with the Universal Serial Bus standard.

21. A method for making a computer peripheral device useable with a Universal Serial Bus equipped computer using the Universal Serial Bus standard, comprising:

starting up a programmed non-volatile memory having preprogrammed data bits related to the Universal Serial Bus standard for the computer peripheral device and providing said data bits for configuring a state machine; and configuring said state machine to be able to provide and receive signals from the computer peripheral device, translate said signals into Universal Serial Bus signals to and from the Universal Serial Bus equipped computer in conformance with the Universal Serial Bus standard.

22. A Universal Serial Bus node for a computer peripheral device to be used with a Universal Serial Bus equipped computer using the Universal Serial Bus standard, comprising:

a non-volatile memory programmable with data bits related to the Universal Serial Bus and the computer peripheral device; and a state machine connected to said memory responsive to said data bits for configuring said state machine to have the capability of translating signals from the computer peripheral device into Universal Serial Bus signals in conformance with the Universal Serial Bus standard to the Universal Serial Bus equipped computer and translating Universal Serial Bus signals from the Universal Serial Bus equipped computer to signals for the computer peripheral device.

23. The Universal Serial Bus node as claimed in claim 22 wherein said state machine is responsive to said information from said memory for configuring said state machine to have the capability of identifying the computer peripheral device to the Universal Serial Bus equipped computer in conformance with the Universal Serial Bus standard.

24. A Universal Serial Bus node for a computer peripheral device to be used with the Universal Serial Bus equipped computers using the Universal Serial Bus standard, comprising:

a memory programmable with information related to the Universal Serial Bus and the computer peripheral device;

said memory is a non-volatile memory; and circuitry connected to said memory responsive to said information for configuring said circuitry to have the capability of providing signals from the computer peripheral device to the Universal Serial Bus equipped computer in conformance with the Universal Serial Bus standard.

25. A Universal Serial Bus node for a computer peripheral device to be used with the Universal Serial Bus equipped computers using the Universal Serial Bus standard, comprising:

a memory programmable with information related to the Universal Serial Bus and the computer peripheral device;

said memory is a non-volatile memory;

circuitry connected to said memory responsive to said information for configuring said circuitry to have the capability of providing signals from the computer peripheral device to the Universal Serial Bus equipped computer in conformance with the Universal Serial Bus standard; and said circuitry is a state machine.

26. A Universal Serial Bus node including a computer peripheral device and a Universal Serial Bus equipped computer using the Universal Serial Bus standard, comprising:

said Universal Serial Bus equipped computer queries said computer peripheral device for identification;

a memory programmable with information related to the Universal Serial Bus and the computer peripheral device; and circuitry connected to said memory responsive to said information for configuring said circuitry to have the capability of providing signals from the computer peripheral device to the Universal Serial Bus equipped computer in conformance with the Universal Serial Bus standard, said circuitry identifies said computer peripheral device to said Universal Serial Bus equipped computer;

said Universal Serial Bus equipped computer responds to said circuitry;

said circuitry responds to said computer peripheral device; and said computer peripheral device providing signals for said circuitry to provide to said Universal Serial Bus equipped computer, all in conformance with the Universal Serial Bus standard.

* * * * *

UNITED STATES PATENT AND TRADEMARK OFFICE
CERTIFICATE OF CORRECTION

PATENT NO : 6,044,428
DATED : Mar. 28, 2000
INVENTOR(S): Madhu Rayabhari

It is certified that error appears in the above-identified patent and that said Letters Patent is hereby corrected as shown below:

Col. 1, line 31 delete "and," and insert --, and--

Col. 6, line 36 delete "standards" and insert --standard--

Col. 8, line 61 delete "the" and insert --a--

Col. 8, line 62 delete "computers" and insert --computer--

Col. 9, line 8 delete "the" and insert --a--

Col. 9, line 9 delete "computers" and insert --computer--

Signed and Sealed this

Thirteenth Day of March, 2001

Attest:

NICHOLAS P. GODICI

Attesting Officer    Acting Director of the United States Patent and Trademark Office